No. 652,527. Patented June 26, 1900.
W. WAGNER.
FILTER MECHANISM.
(Application filed Feb. 13, 1900.)
(No Model.)

Witnesses
Samuel G Hamblen
Edward W. Sweig

Inventor
Walter Wagner
By his Attorney Zimmerman.

UNITED STATES PATENT OFFICE.

WALTER WAGNER, OF BERWYN, ILLINOIS.

FILTER MECHANISM.

SPECIFICATION forming part of Letters Patent No. 652,527, dated June 26, 1900.

Application filed February 13, 1900. Serial No. 5,051. (No model.)

*To all whom it may concern:*

Be it known that I, WALTER WAGNER, a citizen of the United States, residing at Berwyn, in the county of Cook and State of Illinois, have invented certain new and useful Improvements in Filter Mechanism, which are fully set forth in the following specification, reference being had to the accompanying drawings, forming a part hereof, and in which—

Figure 1:
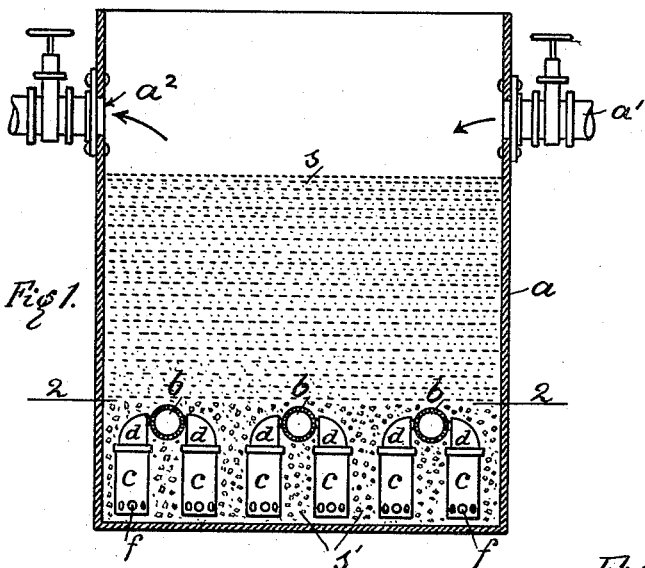
Figure 3:
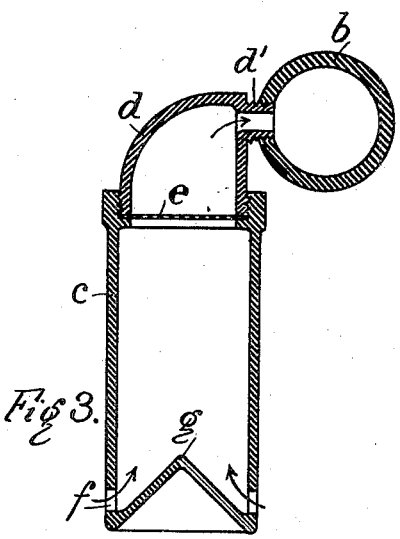
Figure 2:
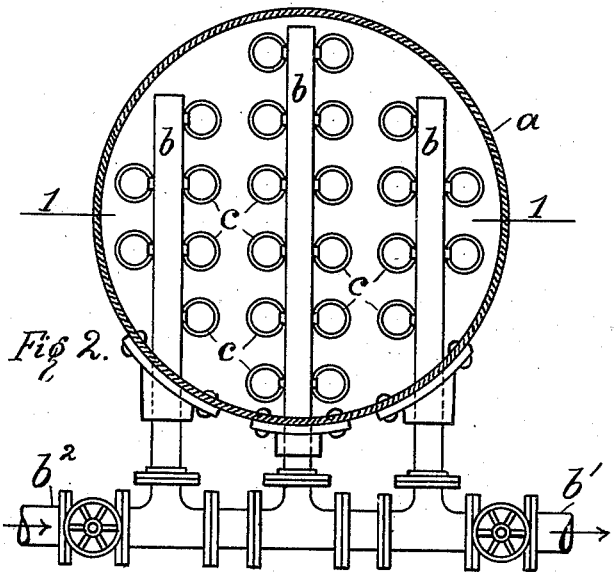
Figure 4:
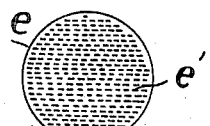

Figure 1 shows a central vertical section of a filtering-tank $a$, taken on the plane 1 1 of Fig. 2, provided with my improved sand-trap or sand-screening mechanism, also showing a filling-pipe $a'$ and a discharge washing-pipe $a^2$. Fig. 2 shows a transverse section of Fig. 1 on a plane 2 2 of Fig 1, with the discharging-pipe $b'$ and washing-pipe $b^2$. Fig. 3 shows a central vertical section of my said improved filter-screen on an enlarged scale and attached to a drain-pipe, the latter shown in cross-section. Fig. 4 shows my screen-plate in plan view.

Like letters of reference denote like parts in all the figures.

The object of my invention is to provide an improved screening and filtering mechanism or sand-trap for filters in which the water to be filtered is made to take such a course as to prevent sand from entering the drain-pipes and in which the screen when used shall be practically free from the clogging and stopping action with which the heretofore-constructed screens are troubled.

To attain said desirable end, I construct my said new device in substantially the following manner, namely:

Into the basin $a$, and as near to the bottom thereof as the several combined necessary elements shall permit, I place the usual horizontal drain-pipes $b$, to which are connected my vertical screen-holder pipes $c$, having a coned bottom $g$, with side openings $f$ close to said bottom or otherwise formed for the admission of water at said end. To the top of the pipe $c$ is fitted another section $d$ of the pipe $c$, having a connector-tube $d'$, wherewith it is connected to the drain-pipe $b$, and at the lower end of said pipe $d$ is a screen $e$, of sheet metal, provided with minute holes $e'$ to pass the water and trap the sand on its face side. Said screen $e$ is here shown between the joined ends of the pipes $c$ $d$, which are conveniently screwed together.

Sand $s$ in the basin $a$ is the preferable material down through which the water filters in the direction of gravity, as usual, but with this significant difference, however, that the coarsest sand or fine gravel $s'$ is placed around the pipes $c$, and especially near the entrances $f$, for the purpose of affording a more free ingress to the water and also for the purpose of allowing fine particles of solid matter to find their way outward when the current is reversed, as in washing the filter, and become trapped in the most distant sand-crevices of the filter-bed, to which they can thus be forced so as not to again come into the current flowing into the tube $c$ or to its screen $e$. To still further facilitate the riddance of such objectionable matter, the coned bottom $g$ is provided for the purpose of giving the most vigorous deflection to said outgoing material.

The tube or tubes $c$ $d$ serve to both hold the screens $e$ and to shield them from the presence and contact of the sand or the clogging of the said screen by particles of sand or other material carried in the water and, most important of all, to both invert and direct the flow of water to said screen, which said water-flow for my special purpose must be to and through said screen against the action of gravity. When the water-flow is directed through the screen in said manner, no sand particles will touch the screen until the current becomes strong enough to lift them, and then their contacting force with said screen will be so slight and so constantly counteracted by gravity that their hold will be so weak, if it should at all become a hold, that the first shock of a reversing or washing current would immediately dislodge such material and throw it down on the cone $g$, from which it will be deflected and forced out through the holes $f$ and into the gravel interstices at $s'$ and on into the finer and remoter channels of the sand-bed, within which it will become so securely wedged and held that its release and return to the screen will rarely, if ever, happen, and thus be insured a perpetually-clear and fully-operative screen. Obviously the contact of any sand against the under or filtering face of said screen can readily be controlled or prevented by merely regulating the proportion, place, and number of such screen-tubes and screens and inflowing velocity of water, which when great can be reduced in the screen-tubes by merely increasing the diameter of each tube, also by increasing its height and the number of tubes, each, or more or less of said and other conditions collectively, until such a rate of water-flow is established as will produce a current so slow in its upflow that gravity will free from it all sand particles, and therefore secure an absolutely clean and unobstructible sand-screen, and since it has been shown that the tube $c$ or tubes or screen-housing $c$ $d$ may be lengthened or shortened indefinitely it has become equally obvious, from what has been said, that the said housing may also be dispensed with entirely and the screen $e$ placed directly on the drain-pipe, provided the inflow be directly against gravity, or, on the other hand, the tube or housing so extended and enlarged and the sand and gravel of suitable sizes so placed and the current so regulated that no filter-screen or sand-screen $e$ would be necessary, provided the inflowing water moved slow enough and far enough against the direct force of gravity.

What I claim is—

1. The combination with a filter-bed and drain-pipes at or near its bottom, of mechanism connected to said drain-pipes adapted to reverse the gravity-actuated flow through said bed into a current of expanded volume and thereby reduced velocity contrary to the action of gravity and discharge into said drain-pipe, substantially as specified.

2. The combination with a filter-bed and drain-pipes at or near its bottom and mechanism connected to said pipes adapted to reverse the gravity-actuated flow through said bed into a current of expanded volume and thereby reduced velocity contrary to the action of gravity and discharging into said drain-pipes, of a screen within and near the top of said current-changing mechanism, substantially as specified.

3. The combination with a filter-bed and drain-pipes at or near its bottom, of mechanism connected to said drain-pipe and provided with internal screens near the top of said mechanism, adapted to change the gravity-actuated flow through said bed into a current contrary to the action of gravity and expanded volume and reduced velocity discharging into said drain-pipe, substantially as specified.

4. The combination with a filter-bed having drain-pipes at or near its bottom, of vertical sand-trap pipes, open at their lower ends, attached to said drain-pipes and discharging therein at their upper ends and extending downward from said drain-pipes, substantially as specified.

5. The combination with a filter-bed having drain-pipes at or near its bottom and vertical sand-trap pipes open at their lower ends, attached to said drain-pipes, and discharging therein at their upper ends, and extending downward from said drain-pipes, of a screen within each of said sand-trap pipes, near their upper ends, substantially as specified.

WALTER WAGNER.

Witnesses:
WM. ZIMMERMAN,
J. S. FLETCHER.